(12) United States Patent
Birkwald

(10) Patent No.: US 8,256,314 B2
(45) Date of Patent: Sep. 4, 2012

(54) COST-EFFECTIVE STEERING MECHANISM

(75) Inventor: Frank Birkwald, Ostfildern (DE)

(73) Assignee: ThyssenKrupp Presta AG, Eschen (LI)

( * ) Notice: Subject to any disclaimer, the term of this patent is extended or adjusted under 35 U.S.C. 154(b) by 288 days.

(21) Appl. No.: 12/732,384

(22) Filed: Mar. 26, 2010

(65) Prior Publication Data
US 2010/0242639 A1 Sep. 30, 2010

(30) Foreign Application Priority Data
Mar. 27, 2009 (DE) .................. 10 2009 014 671

(51) Int. Cl.
*F16H 1/04* (2006.01)
*F16H 35/00* (2006.01)
(52) U.S. Cl. ...................... 74/388 PS; 74/422
(58) Field of Classification Search .......... 74/422, 74/388 PS; 384/255, 447
See application file for complete search history.

(56) References Cited

U.S. PATENT DOCUMENTS

| 719,562 | A | * | 2/1903 | Brush | 74/498 |
| 3,820,415 | A | * | 6/1974 | Cass | 74/498 |
| 5,778,731 | A | * | 7/1998 | Heep | 74/498 |
| 6,247,375 | B1 | * | 6/2001 | Gierc et al. | 74/388 PS |
| 2007/0000341 | A1 | * | 1/2007 | Arlt et al. | 74/409 |

FOREIGN PATENT DOCUMENTS

| DE | 1886801 U | 1/1964 |
| DE | 1230684 B | 12/1966 |
| GB | 1149590 A | 4/1969 |

* cited by examiner

*Primary Examiner* — Justin Krause
(74) *Attorney, Agent, or Firm* — Connolly Bove Lodge & Hutz LLP

(57) ABSTRACT

The invention relates to a rack-and-pinion steering gear with a steering housing, which is tubular and has a housing axis, wherein in the steering housing a rack is mounted in bearings displaceably towards a longitudinal axis, and with a steering pinion, which is mounted in a pinion housing rotatably about an axis and has a pinion gearing, which engages with a gearing of the rack, in which at least one bearing is formed as an eccentric sliding bearing, which can rotate relative to the steering housing, so that the rack can be pressed towards the steering pinion.

12 Claims, 2 Drawing Sheets

COST-EFFECTIVE STEERING MECHANISM

Figure 1:
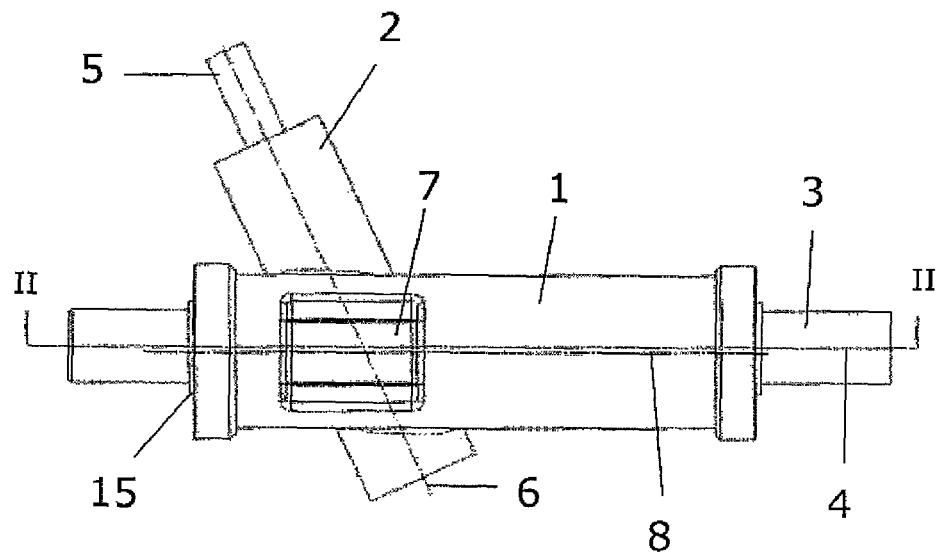

The present invention relates to a steering gear in the structural form of a rack-and-pinion steering with the features of the preamble of claim 1.

In automotive engineering at present by far the predominant proportion of rack-and-pinion steering systems are used as steering gears. This applies both for hydraulic or electrically servo-assisted steering systems and for non servo-assisted steering systems. These steering gears generally have a steering housing with a rack and pinion mounted therein displaceably in the longitudinal direction. A steering pinion is rotatably arranged in a pinion housing and engages in compatible gearing of the rack. The steering pinion in turn is connected to a steering column and a steering-wheel for operating the steering system.

The gearing engagement between the pinion and the rack should be free from play, particularly because otherwise, in the case of straight ahead motion or reversal of the load direction, noises develop in the gearing engagement. Also steering play is disadvantageous for handling a motor vehicle on the road.

Numerous rack-and-pinion steering system are known in the prior art. The German utility model DE 1886801 U for example shows a non servo-assisted rack-and-pinion steering with a tubular steering housing and a pinion in the arrangement described above. A thrust piece is arranged on the side, lying opposite the gearing, of the rack and under spring pretension pushes the rack to engage the pinion. This thrust piece with its further components is costly to produce and assemble. A separate connecting piece is required on the steering housing. The thrust piece must be provided with a spring and an adjusting screw as well as a lock nut to secure the adjusting screw. Its shape must be adapted very precisely to the rack and the connecting piece. Furthermore the thrust piece must be lubricated and adjusted. This is a substantial complexity, which also contributes to the cost of such a steering system. Nevertheless almost all rack-and-pinion steering systems are currently provided with a thrust piece.

Another technical solution is known from German examined and published application DE 1230684 A. There the rack is mounted on both, sides in sliding bearings in the steering housing. Their position in the radial direction is precisely fixed in the steering housing. For ensuring engagement in a manner free from play, the steering pinion at its end facing the steering column is mounted in a pivotal bearing. The free end of the pinion is arranged in a bearing; whose position is adjustable. The bearing itself can be displaced in a direction perpendicular to the rack. In this case the bearing of the rack is simplified but the bearing of the pinion is very complex and hence cost-intensive. This steering system has not caught on in practice.

It is therefore an object of the present invention to improve a rack-and-pinion steering in such a way that engagement in a manner free from play between the pinion and the rack can be achieved by simple and economic means.

In particular it is an object of the present invention to minimise the number of components in a rack-and-pinion steering.

This object is achieved by a steering gear with the features of claim 1.

Because in the case of a rack-and-pinion steering gear with a steering housing, which is tubular and has a housing axis, wherein in the steering housing a rack is mounted in bearings displaceably towards a longitudinal axis, and with a steering pinion, which is mounted in a pinion housing rotatably about an axis and has a pinion gearing, which engages with a gearing of the rack, at least one bearing is formed as an eccentric sliding bearing, which can rotate relative to the steering housing, so that the rack can be pressed towards the steering pinion, during assembly of the steering gear the rack can be pressed towards the pinion by rotating the bearing, so that the play in this gearing engagement can be adjusted. Because the steering housing, on the side facing away from the pinion housing relative to the gearing engagement, also has a groove, which almost reaches the rack, engagement of the pinion with the rack is ensured, even if the rack is subjected to heavy radial loading, which far exceeds the load in normal operation.

Adjustment is particularly simple if the bearing can be rotated about the axis and as a result the position of the longitudinal axis can be adjusted relative to the axis of rotation.

Preferably both sliding bearings of the rack are eccentrically configured.

If the at least one sliding bearing with an outer collar extends outwards over the steering housing, the free face of the steering housing forms a stop for the bearing in the assembly direction.

The collar extending over the steering housing can be used as seat of a gaiter, which surrounds the track rod connection and protects against weather influences. The eccentric sliding bearing preferably has a slip ring, coming into contact with the rack, produced from metallic material, in particular steel. Preferably an elastomer is arranged between the outer cap-type mounting and the slip ring, which provides the cushioning properties of the sliding bearing. If a thin-walled, flexible region is formed between the elastomer and the outer securing ring, in the shape of the cap-type mounting for example, the eccentric bearing at the same time can take over the function of a stop cushioning for the rack in its end positions. As a result further components are eliminated. This applies particularly if the bush projects outwards over the outer race in the axial direction.

Simple cushioning is feasible if the bush and the Outer bearing race are connected to one another in a firmly-bonded and integral manner with an elastomer arranged between them. In addition the integral construction simplifies handling during assembly.

Preferably at least the internal bush is produced from steel.

A particularly space-saving embodiment results if the steering housing and the pinion housing are produced from steel tube and welded together. Especially compared to conventional housings produced from light metal castings, this embodiment also has a cost advantage.

If the steering housing in the region of the groove has a friction-reducing surface, which rests against the rack, the play there can be reduced to zero. In addition if the steering housing in the region of the groove has a surface formation with at least one small-size elevation by way ribs or embossments, wherein at least one of the elevations rests against the rack, the push force required for shifting the rack during operation is reduced.

If the steering gear does not have a thrust piece, the housing connecting piece otherwise necessary for this can be eliminated.

The steering is particularly simplified if the rack is free from force application points such as for example a hydraulic motor or gearing for an electromotive accessory steering drive directly powering the rack.

Figure 2:
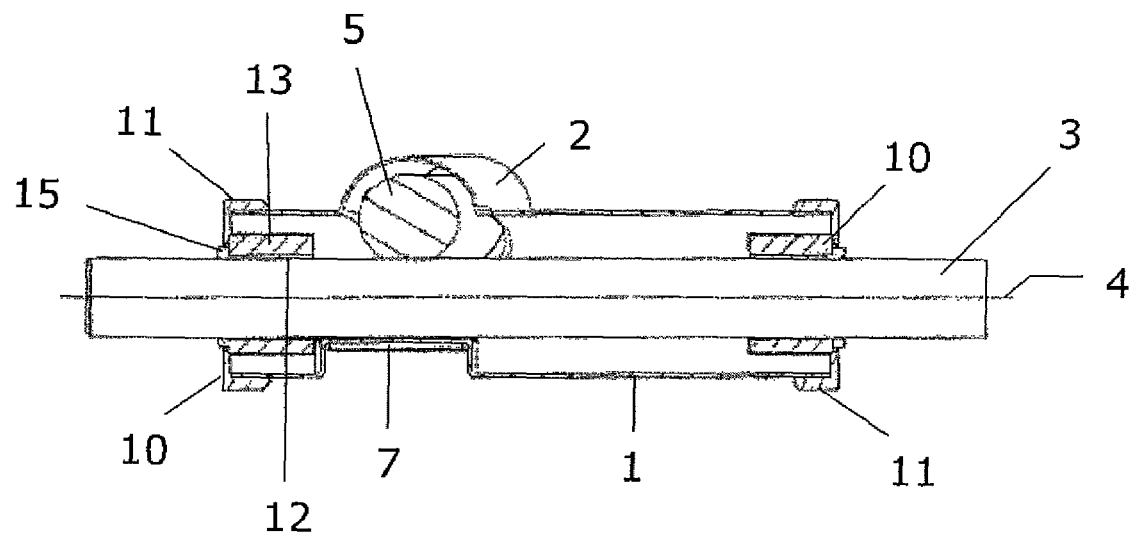
Figure 3:
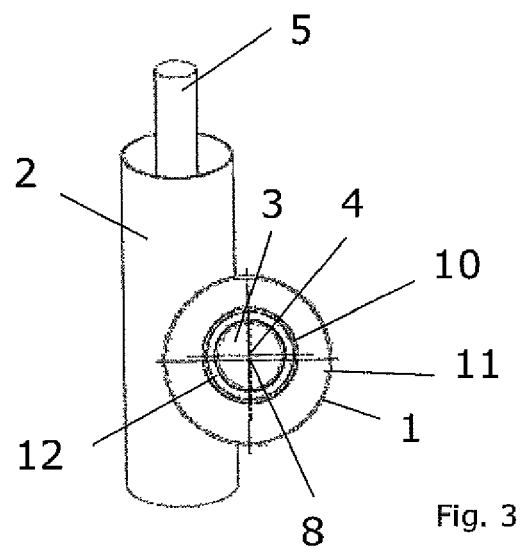
Figure 4:
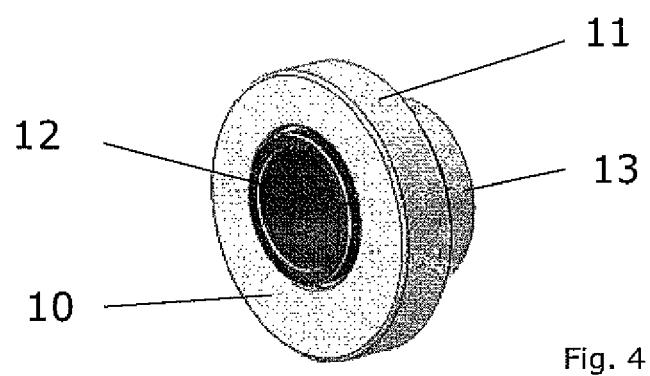

The present invention is described in further detail below on the basis of the drawing, wherein:

FIG. 1: shows a steering gear according to the invention in a top view;

FIG. 2: the steering gear from FIG. 1 in a profile along line II-II;

FIG. 3: the steering gear from FIG. 1 and FIG. 2 in a view towards the longitudinal axis of the rack;

FIG. 4: an eccentric bearing in a perspective view from the outside; and

Figure 5:
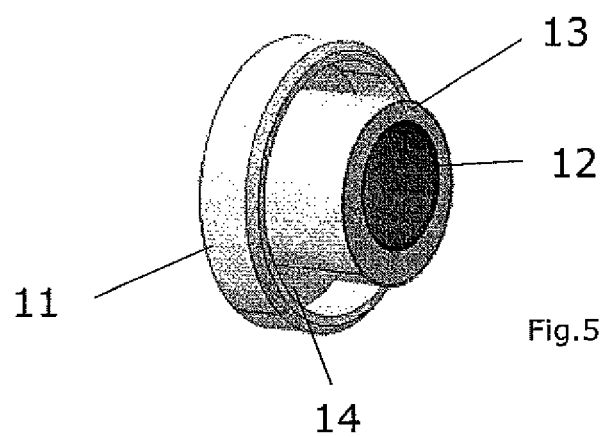

FIG. 5: the bearing from FIG. 4 in a perspective view onto the inside.

FIG. 1 illustrates a steering gear according to the invention with a steering housing 1 and a pinion housing 2 attached thereto in a top view. The Steering housing 1 supports a rack 3, which can be displaced lengthwise towards a longitudinal axis 4. A steering pinion 5 is mounted in the pinion housing 2 rotatably about a longitudinal axis 6. The bearing of the pinion in the pinion housing 2 is formed in such a way that the axis of rotation 6 is fixed relative to the pinion housing 2.

The steering pinion 5 engages with corresponding gearing of the rack 3. The zone of contact lies in the region of the intersection of axes 4 and 6. The steering housing 1 is provided opposite the gearing engagement with a groove 7, which descends down to near the rack 3.

FIG. 2 shows a profile through the steering gear from FIG. 1 along line II-II. Same components are designated by the same reference numbers.

The steering housing 1 has a bearing 10 at the two free ends, which are penetrated by the rack 3 in each case. The bearing 10 is designed as sliding bearing and supports the rack 3 in the radial direction relative to the axis 4. The bearing 10 is formed with a circular collar 11 in each case, the collar 11 extending outwards over the faces of the steering housing 1.

FIG. 3 shows the steering gear from FIG. 1 and FIG. 2 in a view towards the axis 4 of the rack 3. In this illustration it is evident that the rack 3 is mounted off centre in the steering housing 1. The longitudinal axis 4 of the rack 3 is slightly distant from the longitudinal axis 8 of the steering housing 1. This distance is caused by the bearing 10, whose bearing race 12 is arranged eccentric to the collar 11.

FIG. 4 shows the bearing 10 in a perspective illustration with top view onto the side lying outside in FIGS. 1 and 2. The bearing 10 comprises the outer collar 11 and the bush 12. The collar 11 and the socket 12 are preferably produced from steel. A region consisting of an elastomer 13 is provided positively connected between the collar 11 and the bush 12.

In FIG. 5 the bearing 10 is finally illustrated from another perspective. The side facing the interior of the steering housing 1 is illustrated.

As FIG. 5 shows the outer race 11 of the bearing 10 is provided with a wall thickness, which lies in the range of a few millimetres. This means that the outer race 11 during assembly extends over the surface of the steering housing 1 accordingly. For the complete steering it is proposed that the steering housing is encapsulated outwards with gaiters known per se which protect the free ends of the rack 3 and the track rods attached thereto against weather influences. Due to the thickness of the external walls 11 a corresponding gaiter can be fitted over the bearing 10, so that it engages resting behind the outer race 11. In this position the gaiter can then be secured for example with a cable truss or a clip.

FIG. 5 also shows that the bush 12 is eccentrically embedded in the elastomer 13. Between the elastomer 13 and the outer race 11 lies a thin-walled region 14.

The bearing 10 can be produced in such a manner for example that the outer race 11 and the bush 12 consist of metal. They are then encased with the elastomer 13 in the way known per se. The composite component developed in this manner is used as a single part in the production of an inventive steering system and as a result simplifies handling.

A device, in which the bearings 10 are held, is used during assembly. The rack 3 is fed into the housing 1 and the pinion 5 is mounted on corresponding bearings in the pinion housing 2. Then both bearings 10 are placed on the free faces of the steering housing 1 and by means of the device are rotated, preferably synchronously, about the longitudinal axis 8, which coincides with the centre of the outer races 11. This procedure is carried out in such a way that the pinion 5 and the rack 3 engage in a manner free from play. A radial load on the bushes 12, arising at the same time, causes flexible deformation of the elastomer 13 and as a result flexible pre-tensioning of the rack 3 against the pinion 5. In this position the bearings 10 are then fixed on the steering housing 1. Therefore the steering gear is permanently, adjusted in a manner free from play.

Now the (not illustrated) track rod ends and track rods are secured to the free ends of the rack 3. Gaiters are fitted across the track rods and the outer races 11 of the bearings 10, until these come to rest behind the outer races 11. The gaiters can be additionally fixed by a clip or cable strap in each case.

The bush 12 can project outwards over the face of the bearing 11. This is illustrated in FIG. 1 and in FIG. 2 as projection 15. In the end positions of the rack 3 the (not illustrated) track rod ends can abut against the projection 15. The bushes 12 are then pushed in the axial direction against the elastomer 13. The elastomer 13 in this case deforms flexibly. Metallic contact does not ensue between the track rod end and the steering housing 1. The bush 12 in this Operation function's as stop cushion. In this embodiment therefore the bearing 10 fulfils three functions in total, that is to say support of the rack 3 relative to the steering housing 1, pressing of the rack 3 against the pinion 5 and flexible pre-loading of the engagement as well as the stop buffer for the end position cushioning of the rack 3.

The steering gear described to this extent is especially advantageous for relatively small and light passenger cars, in which no servo-assistance in the steering gear itself acts upon the rack. Such steering systems are used either completely without servo-assistance or the servo-assistance engages with the steering shaft in the power flow above the pinion 5, hence outside the actual steering gear. The steering gear is accordingly very simply constructed with few components and therefore lightweight and inexpensive. A thrust piece with all associated components as well as the normally fitted stop cushions can be eliminated.

The invention claimed is:

1. A rack-and-pinion steering gear, comprising:
   a steering housing, which is tubular and has a housing axis,
   a rack mounted in the steering housing in bearings displaceably towards a longitudinal axis, and
   a steering pinion, which is mounted in a pinion housing, rotatably about an axis of rotation, and which has a pinion gearing configured to engage with a gearing of the rack,
   wherein at least one bearing is formed as an eccentric sliding bearing configured to rotate relative to the steering housing to enable the rack to be pressed towards the steering pinion,
   wherein the steering housing, on a side facing away from the pinion housing, has, opposite the gearing engagement, a groove configured to extend near to the rack or to rest on the rack, and
   wherein no thrust piece is used to urge the rack into engagement with the pinion during operation.

2. The rack-and-pinion steering gear according to claim 1, wherein the bearing is configured to be rotated about the axis of rotation to thereby enable a position of the longitudinal axis to be adjusted relative to the axis of rotation.

3. The rack-and-pinion steering gear according to claim 1, wherein at least one bearing has an outer bearing race and an internal bush which are arranged eccentrically to one another.

4. The rack-and-pinion steering gear according, to claim 3, wherein the outer bearing race and the internal bush are connected to one another in an integral manner, with an elastomer arranged between them.

5. The rack-and-pinion steering gear according to claim 3, wherein at least the internal bush is produced from steel.

6. The rack-and-pinion steering gear according to claim 3, wherein the internal bush projects towards the longitudinal axis outwards over the outer bearing race.

7. The rack-and-pinion steering gear according to claim 1, wherein an eccentric bearing is provided at two opposite-lying ends of the steering housing.

8. The rack-and-pinion steering gear according to claim 1, wherein at least one bearing includes an outer race that forms an outer collar, which extends outwards over the steering housing.

9. The rack-and-pinion steering gear according to claim 1, wherein the steering housing and the pinion housing are produced from steel tube and welded together.

10. The rack-and-pinion steering gear according to claim 1, wherein the rack is free from force application points for a steering accessory drive.

11. The rack-and-pinion steering gear according to claim 1, wherein the steering housing in the region of the groove has a friction-reducing surface, which rests on the rack.

12. The rack-and-pinion steering gear according to claim 1, wherein the steering housing in the region of the groove has a surface formation with at least one elevation, wherein at least one of the elevations rests on the rack.

* * * * *